April 1, 1952
F. M. REED
2,591,605
ELECTRIC POWER SUPPLY SYSTEM
Filed Oct. 20, 1947
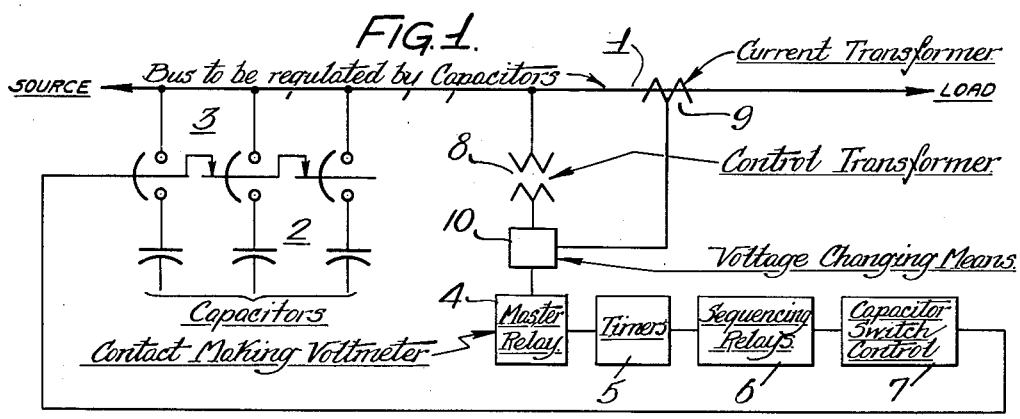
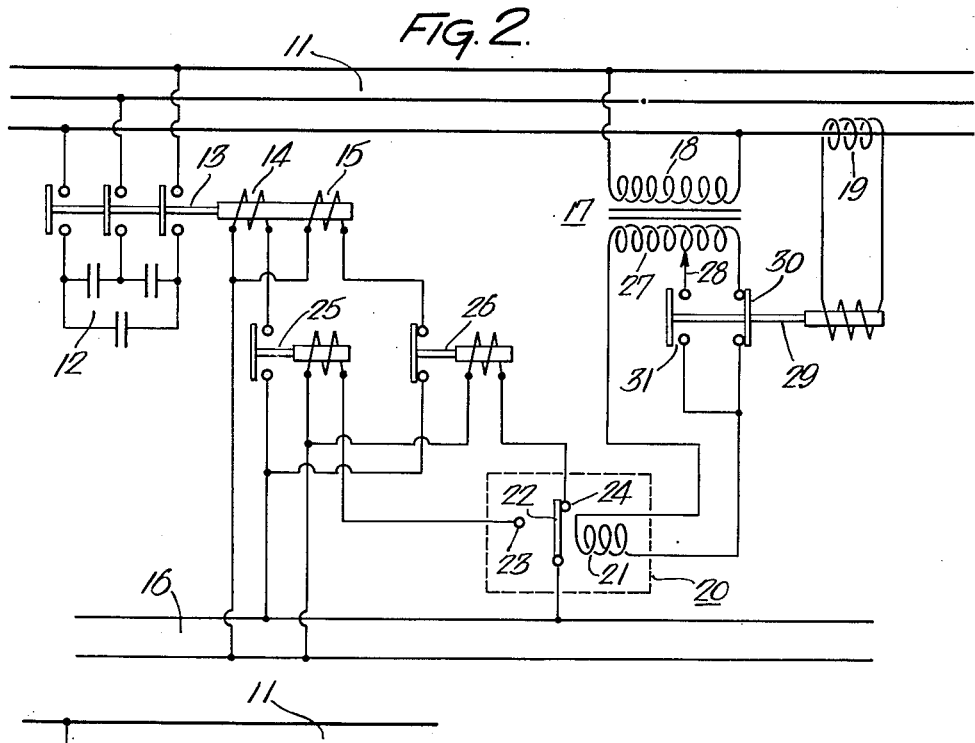
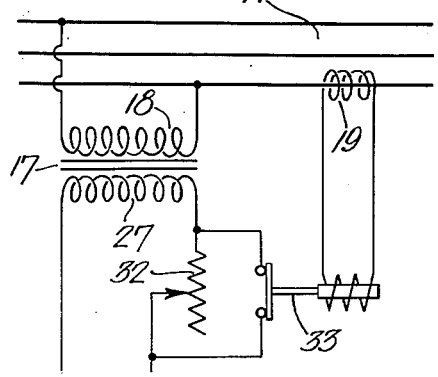
Inventor:
Frank M. Reed
by his Attorneys
Howson &
Howson Patented Apr. 1, 1952

2,591,605

UNITED STATES PATENT OFFICE 2,591,605

ELECTRIC POWER SUPPLY SYSTEM

Frank M. Reed, Elton, Pa.

Application October 20, 1947, Serial No. 780,901

7 Claims. (Cl. 323—106)

This invention relates to electric transmission or distribution systems, and more particularly to voltage regulation in such systems.

One method of improving voltage regulation and reducing losses in such systems is by the use of static capacitors which are switched on or off the power supply line as needed. The present invention relates particularly to this general method of control.

There are several commonly used types of control for switching capacitors on or off a power supply line in the practice of the above-mentioned method of control. The principal types of control are the following: manual control in which the switching operations are performed by an operator; time clock control in which the switching operations are performed at predetermined times by a time clock control system; current control in which the switching operations are automatically performed according to the magnitude of the load current on the line; and voltage control in which the switching operations are performed according to the magnitude of the line voltage. Each of these prior types of control has its limitations particularly when applied to a large system.

On many transmission systems static capacity at the time of light loads is very undesirable because, added to the capacitance of the transmission system, it can cause system instability with insufficient inductive load. However, with generator bus voltage control or other forms of voltage regulation on the system, the voltage at any given point may be purposely less at light load than at higher loads. These conflicting requirements preclude the use of voltage control of static capacity at many points on many systems.

Current control of static capacity serves to disconnect the capacitors from the system at light load, but no control of voltage increases caused by the capacitors is attained; nor are exceptionally low voltage conditions corrected by capacitors in spite of low current.

Manual control is impractical at many desirable locations for capacitors because there is no operator at many such points, and furthermore such control is subject to the whims and errors of judgment of operators.

Supervisory control is an extension of manual control. It is not only costly but is subject to the same operating errors even though costly telemetering or other supervisory checking of voltages aand currents is added to the supervisory system.

Time clock control is obviously inadequate in many instances, as most loads do not follow a definite pattern day after day, nor do operating conditions at a given substation follow a pattern which corresponds either to time or load.

The principal object of the present invention is to provide an improved type of control which overcomes the various objections and limitations of prior types of control.

Another object of the invention is to provide an improved method of control of capacitors in order to make the automatic control thereof more versatile and more widely applicable to any transmission or distribution system.

These and other objects are achieved by the provision of a control system in which the switching of static capacitors on and off a line is performed according to both the voltage and load conditions existing on the line at any particular time.

Reference is now made to the accompanying drawing, wherein

Fig. 1 is a generalized illustration of a system embodying the present invention;

Fig. 2 is a diagrammatic illustration of a simple control system embodying the invention; and Fig. 3 is an illustration of a modified portion of the system.

Referring to Fig. 1, 1 represents a line or bus to be regulated by capacitors 2 having associated switching means 3. The switching of the capacitors 2 is effected by a master relay 4 through apparatus which may include timers, sequencing relays and switch control means, as represented by the blocks 5, 6 and 7. In accordance with the present invention, a voltage is supplied from the line 1, by means of a control transformer 8, to actuate the master relay 4; and this voltage is varied according to load conditions by means of a current transformer 9 and a voltage changing means 10 which is controlled from the transformer 9. The invention contemplates the use of any suitable embodiment of the generalized scheme shown in Fig. 1.

Referring now to Fig. 2, there is shown specific embodiment of the invention. A three-phase line 11 is representative of any part of an electric transmission or distribution system. For the purpose of simple illustration of the invention, there is shown a bank of static capacitors 12 which are to be switched on or off the line 11 according to the voltage and load conditions thereon. To further simplify the illustration, it is assumed that the entire bank of capacitors will be switched on or off the line as a unit, although in many instances this will not be the case. A circuit breaker or electrically-operable switch 13 is provided to perform the switching operations. As is common in such devices, the device 13 has a closing coil 14 and a trip coil 15. These coils are selectively energized, as hereinafter described, from any suitable control voltage source as represented by the control line 16.

In accordance with the present invention, there is provided a potential transformer 17 whose primary winding 18 is connected across two conductors of the line 11, and there is also provided a current transformer 19 which is connected to one of the line conductors. There is also provided a master relay 20 which may take the form of a contact-making voltmeter, it being intended that this device shall be responsive according to the magnitude of the voltage supplied thereto. This device is represented as having an energizing coil 21, a movable contact arm 22, and spaced contacts 23 and 24 which are selectively engageable by the arm 22, depending upon the magnitude of the voltage supplied to coil 21. The device 20 controls the switching of the capacitors 12 on or off the line 11 according to the magnitude of the voltage supplied to the coil 21.

By way of simple illustration, there are shown two relays 25 and 26 which are controlled by the device 20 and which, in turn, control the energization of the coils 14 and 15 of circuit breaker 13. When a relatively large voltage is applied to the device 20, the movable contact 22 thereof engages contact 24, as shown, and energizes relay 26 through a circuit which may be readily traced. Consequently, the contacts of relay 26 are closed, as shown, and they energize the trip coil 15 of circuit breaker 13 through a circuit which is readily traceable. At such time, therefore, the circuit breaker 13 is opened or is held open.

When the voltage supplied to the device 20 is of lower value such as to cause contact 22 to engage contact 23, the relay 26 and the trip coil 15 are deenergized, and the relay 16 is energized, thus energizing the closing coil 14. This effects closure of the circuit breaker 13 to place the capacitors 12 on the line.

In accordance with the present invention, the magnitude of the voltage supplied to the device 20 is controlled according to the voltage and load conditions on line 11 through the medium of potential transformer 17 and the current transformer 19. In the form of control illustrated in Fig. 2 variations of the voltage derived from the line 11 are effected by changing the ratio of the transformer 17. To this end, the secondary winding 27 of said transformer is provided with a tap 28, and the effective turns of the secondary winding are varied by means of a current-operated relay 29 which is energized from the current transformer 19. Thus, the voltage derived from line 11 by way of transformer 17 is varied in magnitude according to the load current of the line, through the medium of the current transformer 19 and the relay 29.

Considering the operation of the system, it will be assumed that there is a light load condition on line 11, which causes closure of contacts 30 of relay 29. Under this condition, the full voltage across secondary 27 is applied to the device 20 and causes the contact 22 thereof to engage contact 24. This removes the capacitors 12 from the line, or if they are already off the line it holds them off.

If, under this light load condition, the voltage of line 11 decreases below "normal" for this load condition, the contact 22 of device 20 will engage contact 23, causing the capacitors 12 to be switched onto the line, as above described. When the line voltage returns to normal, the contact 22 of device 20 will engage contact 24, thus removing the capacitors from the line.

Assume now that there is a substantially larger load on the line 11, sufficient to cause opening of the contacts 30 and closure of contacts 31 of relay 29. This reduces the voltage applied to device 20 by effectively removing some of the turns of secondary 27. This lower voltage applied to device 20 causes contact 22 to engage contact 23, thereby placing the capacitors 12 on the line. If the voltage should increase sufficiently to cause contact 22 to engage contact 24, the capacitors will be removed from the line.

It will be apparent from the illustration of Fig. 2 and from the foregoing description, that the control system establishes a voltage range which is determined by the voltage-responsive device 20, and it also establishes a load current range which is established by the relay 29. Obviously, these devices may be made adjustable to permit variation of the control according to the requirements at a particular part of a transmission or distribution system.

As previously mentioned, it will usually be undesirable to switch an entire bank of capacitors on or off a line as in Fig. 2. Usually, it will be desired to switch the capacitors on or off the line in predetermined sequence. Sequencing arrangements for this purpose are well known, and since the illustration of such a system would only add unnecessarily to the illustration and description here and would tend to obscure the invention, the simplified system of Fig. 2 was chosen for the present purpose.

In Fig. 3, there is shown an alternative arrangement for varying the magnitude of the voltage derived by way of transformer 17. In this instance, a variable resistor 32 is connected in series with the secondary 27 of transformer 17, and a relay 33, energized from the current transformer 19, controls a short-circuiting connection about the resistor 32. When a light load condition exists on line 11, the contacts of relay 33 are closed, as shown, thereby applying the full voltage of secondary 27 to the device 20. On greater loads, however, the contacts of relay 33 are opened, removing the short-circuit from about the resistor 32. Due to the voltage drop in the resistor 32, a lesser voltage is applied to the device 20.

It will be seen that the modification shown in Fig. 3 does not change the general operation of the system but merely changes the way in which the voltage derived from line 11 is varied according to the existing load condition. As previously stated, the invention contemplates any suitable arrangement for accomplishing the desired purpose.

From the foregoing description, it will be apparent that the present invention provides a novel type of control which is adaptable to the requirements on any part of a transmission or distribution system, and which enables optimum use of capacitors according to the voltage and load conditions at any time. Moreover, this type of control lends itself readily to sequence operation, as well as to simple switching of capacitors.

I claim:

1. In an electric power supply system, a power supply line, at least one capacitor, electrically-operable switching means for connecting said capacitor to said line or for disconnecting said capacitor from said line, means including a contact-making voltmeter for actuating said switching means according to the magnitude of the voltage supplied to said voltmeter, a potential transformer connected to said line and including an output circuit providing a voltage whose magnitude is proportional to the line voltage, a current transformer connected to said line for deriving therefrom a current whose magnitude is proportional to the load current of said line, voltage varying means included in said output circuit, means including a current-operated relay operable by the derived current for actuating said voltage varying means to vary the voltage in said output circuit in response to different load conditions on said line, and means for applying the voltage of said output circuit to said voltmeter, whereby to control the connection and disconnection of said capacitor according to the voltage and load conditions on said line.

2. A system according to claim 1, including connections controlled by said relay to vary the effective turns-ratio of said potential transformer.

3. A system according to claim 1, including a resistor in series with the secondary winding of said potential transformer, and a short-circuiting connection about said resistor controlled by said relay.

4. In an electric power supply system, a power supply line, at least one capacitor, means including a voltage-responsive device for connecting said capacitor to said line and for disconnecting said capacitor from said line, means for deriving from said line a voltage whose magnitude is proportional to the line voltage, circuit means for applying said derived voltage to said device, and voltage varying means responsive to the load current of said line included in said circuit means for varying the applied voltage in a sense and in sufficient amount to effect connection of said capacitor under a heavy load condition and disconnection of said capacitor under a light load condition.

5. A system according to claim 4, wherein said voltage-deriving means is a potential transformer having a tapped secondary, and said voltage-varying means is adapted to change the effective turns-ratio of said transformer through the medium of the tapped secondary.

6. A system according to claim 4, wherein said voltage-deriving means is a potential transformer, and said voltage-varying means includes a resistor in series with the secondary of said transformer and means for short-circuiting said resistor to render it ineffective.

7. In an electric power supply system, a power supply line, at least one capacitor, means including a voltage-responsive device for connecting said capacitor to said line and for disconnecting said capacitor from said line, means for deriving from said line a voltage whose magnitude is proportional to the line voltage, circuit means for applying said derived voltage to said device, and voltage varying means operable by the load current of said line included in said circuit means for adjusting said voltage from one predetermined operating range to another according to the load condition on said line, whereby the connection and disconnection of said capacitor are effected according to the voltage and load conditions on said line.

FRANK M. REED.

REFERENCES CITED

The following references are of record in the file of this patent:

UNITED STATES PATENTS

| Number | Name | Date |
| --- | --- | --- |
| 1,335,238 | Hopkins | Mar. 30, 1920 |
| 1,843,921 | Gay | Feb. 9, 1932 |
| 1,962,943 | Seeley | June 12, 1934 |
| 2,079,488 | Champlin | May 4, 1937 |
| 2,298,026 | Bany | Oct. 6, 1942 |
| 2,431,242 | Graybrook | Nov. 18, 1947 |
| 2,443,117 | Pittman et al. | June 8, 1948 |

OTHER REFERENCES

Publication, Electrical Engineering, September 1944, vol. 63, pages 674–678 inclusive.